H. W. OSTER AND R. B. TEWKSBURY.
DIESTOCK.
APPLICATION FILED OCT. 2, 1918.

1,361,400. Patented Dec. 7, 1920.

Inventors.
Russell B. Tewksbury
and
Herman W. Oster.
By Thurston & Kwis
attys.

UNITED STATES PATENT OFFICE.

HERMAN W. OSTER AND RUSSELL B. TEWKSBURY, OF CLEVELAND, OHIO, ASSIGNORS TO THE OSTER MANUFACTURING COMPANY, OF CLEVELAND, OHIO, A CORPORATION OF OHIO.

DIESTOCK.

1,361,400.  Specification of Letters Patent.  Patented Dec. 7, 1920.

Application filed October 2, 1918. Serial No. 256,596.

*To all whom it may concern:*

Be it known that we, HERMAN W. OSTER and RUSSELL B. TEWKSBURY, citizens of the United States, and residents of Cleveland, in the county of Cuyahoga and State of Ohio, have invented a certain new and useful Improvement in Diestocks, of which the following is a full, clear, and exact description.

The object of this invention is to provide a very cheap receding die stock. To attain this end the invention comprises a very small number of parts, which may be constructed cheaply and in such form as facilitates their assemblage to form the combination of parts as shown in the accompanying drawing and hereinafter described and pointed out definitely in the appended claims.

Figure 1:
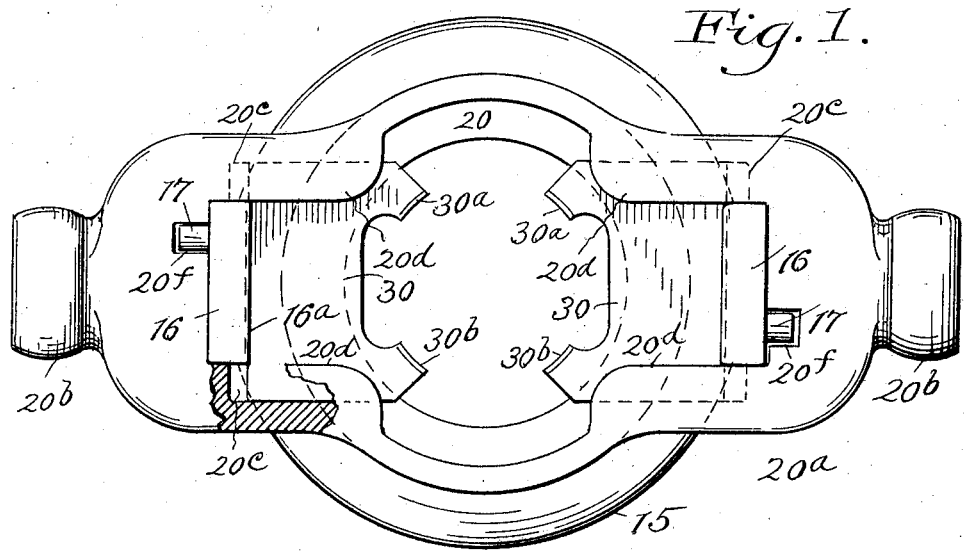
Figure 2:
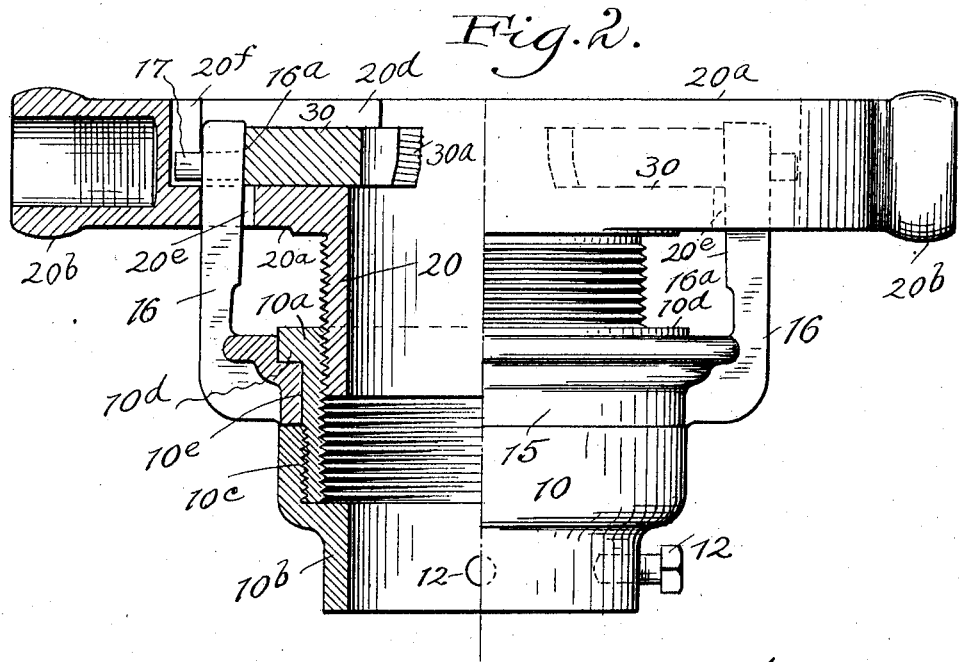

In the drawing, Figure 1 is a top plan view of a die stock in which the invention is embodied; Fig. 2 is a side elevation partly in longitudinal section of said die stock when the parts are in substantially the position they occupy when the tool is in readiness to begin the cutting of a tapered thread upon a pipe.

The die stock shown, in which the invention is embodied in its best form, is composed of the tubular work holder 10, the tubular die carrier 20, the ring 15 having die controlling integral arms 16, and two diametrically opposed radially movable dies 30.

The work holder 10 is composed of a front member $10^a$ and a rear number $10^b$. The rear member is tubular, and has in its front end an enlarged concentric internally threaded cylindrical recess $10^c$. The front member $10^a$ of the work holder is internally threaded from end to end, and is externally threaded near its rear end; and this externally threaded portion screws into the threaded recess in the rear member until the lower end of the front member engages with the bottom of said recess. This front member, at its front end, is provided with an external circumferential flange $10^d$. The external surface $10^e$ of this front member, between said flange and the threaded rear end thereof, is smooth and cylindrical. This construction provides on the composite work holder an external circumferential groove; and the construction is such that the ring 15, which is rotatably mounted in said groove, may be easily put into it. The work holder will, of course, be provided with suitable means, as for example, a plurality of radially extended set screws 12, which screw through it so that they may engage the inserted pipe which is to be threaded, whereby, said pipe will be fastened to the work holder in an axial position.

The die carrier 20 is externally threaded at its rear end, and fitted to screw into the internally threaded front end of the work holder. The front end of the die carrier is formed with an outwardly projecting circumferential flange $20^a$ which at two diametrically opposed points is formed with handle sockets $20^b$. In the front flanged end of the die carrier are two diametrically opposed wide, radially extended guide grooves $20^c$ fitted to receive the dies 30. Each of said guide grooves is undercut so as to form the flanges $20^d$ which overhang and engage the dies which are in said grooves. The flange $20^a$ of the die carrier is also formed with substantially rectangular holes $20^e$ through it, which holes intersect the rear ends of the die guide-ways.

The ring 15 has formed integrally with it, as before stated, two longitudinally extended arms 16 which are fitted to slide through the rectangular holes $20^e$ in the flange of the die carrier, and to engage the sides and outer ends of said holes. The inner faces $16^a$ of these arms are slightly inclined and engage the rear ends of the dies; while the outer faces of said arms are parallel with the axis of the tool. When the tool is being employed to cut a thread on the pipe secured in the work holder, the outthrust of the work upon the dies will push them back against said inclined faces $16^a$ of these arms 16. During the cutting of the thread the die carrier will be screwed into the work holder. Since the ring cannot move longitudinally upon the work holder, the dies will, as the thread is being cut, slide in contact with the inclined inner faces $16^a$ of the arms 16 and will be allowed to slowly recede from the axis of the die, whereby they will cut a taper thread upon the pipe. The out-thrust of the dies against these arms will be taken by the rear ends of the holes in the flange of the die carrier, and the sides of these holes by engaging the sides of the arms compel the ring to rotate in unison with the die carrier.

It will be noted that only two dies 30 are employed instead of four as is the general practice with receding die stocks. But the inner end of each die is formed with two sets 30ª, 30ᵇ of thread cutting teeth,—which two sets are separated by an arcual distance of substantially 90°.

In order that the described parts may be assembled in the coöperative relation shown, the ring 15 is put around the cylindrical part 10ᵉ of the front member 10ª, after which said front member 10ª is screwed into the threaded recess 10ᶜ of the rear member 10ᵇ. Then the die carrier is put in proper position relative to the work holder and with the arms 16 projecting into the holes 20ᵉ in the flange of the die carrier. Thereafter the die carrier is screwed into the work holder.

After the parts have been once assembled as described it is desirable that the accidental disconnection of the die carrier from the work holder shall be prevented. To accomplish this result the pins 17 are driven into the arms 16 near their upper end in such position that when the die carrier has been unscrewed from the work holder as far as it is desired to have it, these pins will engage part of the die carrier and prevent further unscrewing movement. If these pins were made to engage the top face of the die carrier the arms 16 would have to be unduly long in order that the die carrier and work holder could have the proper amount of relative longitudinal movement. To avoid making these arms over long, therefore, short vertical slots 20ᶠ are formed in the front end of the die carrier in such position that the pins 17 will retreat into them and will strike the bottom of these slots when the die carrier has been unscrewed from the work holder as much as is desired.

Having described our invention, we claim:

1. In a die stock, the combination of a work holder formed of two parts, viz., a tubular rear member having an enlarged internally threaded, concentric cylindrical recess in its front end and a tubular rear member which is internally threaded and is externally threaded at its rear end and screwed into the threaded recess in the rear member against the bottom of said threaded recess, and which has an external flange at its front end and an unthreaded cylindrical external surface between the said flange and threaded end, thereby forming a circumferential groove on the outer surface of said work holder, a tubular die carrier which screws into said work holder and has an outwardly projecting flange at its front end. said flange being provided with diametrically opposed radial guide-ways having overhanging integral flanges, and said flange being also formed with holes through it which intersect the rear ends of said guide-ways, a one-piece ring which is rotatably mounted in the above-mentioned circumferential groove on the work holder, and which has integral die controlling arms that pass through and slidably fit the holes in the flange of the die carrier, and which have inclined die engaging inner faces, with dies radially movable in said guide-ways which at their rear ends engage the inclined faces of said arms.

2. In a die stock, the combination of an internally threaded tubular work holder having an external circumferential groove, a ring rotatably mounted in said groove and provided with forwardly projecting integral arms whose inner faces are inclined, an externally threaded tubular threaded die carrier which screws into the work holder and has at its front end an outwardly extended flange through which are holes in which the arms of the ring are slidably fitted, said die carrier having in its front end radial guideways provided with overhanging flanges,—which guideways at their rear end intersect the holes, and dies which are slidably mounted in said guideways with their outer ends in contact with the inclined inner faces of said arms, and a pin fixed to one of said arms in position to engage the die carrier and limit the withdrawal of the latter from the work holder.

3. In a die stock, the combination of an internally threaded tubular work holder having an external circumferential groove, a ring rotatably mounted in said groove and provided with forwardly projecting integral arms whose inner faces are inclined, an externally threaded tubular threaded die carrier which screws into the work holder and has at its front end an outwardly extended flange through which are holes in which the arms of the ring are slidably fitted, said die carrier having in its front end radial guideways provided wiith overhanging flanges,—which guideways at their rear end intersect the holes, and dies which are slidably mounted in said guideways with their outer ends in contact with the inclined inner faces of said arms, and a pin fixed to one of said arms in position to engage the die carrier and limit the withdrawal of the latter from the work holder, said die carrier having in its end a short longitudinally extended slot into which said pin may retreat as the die carrier is unscrewed from the work holder.

In testimony whereof, we hereunto affix our signatures.

HERMAN W. OSTER.
RUSSELL B. TEWKSBURY.